Aug. 3, 1954    E. R. OLSEN    2,685,485
PISTON RING SPACER
Filed Oct. 22, 1953
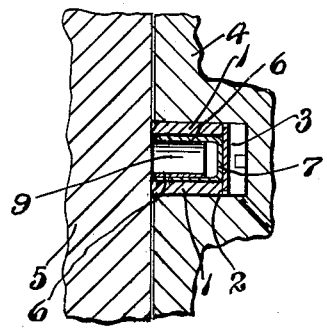
FIG. 1.
FIG. 2.
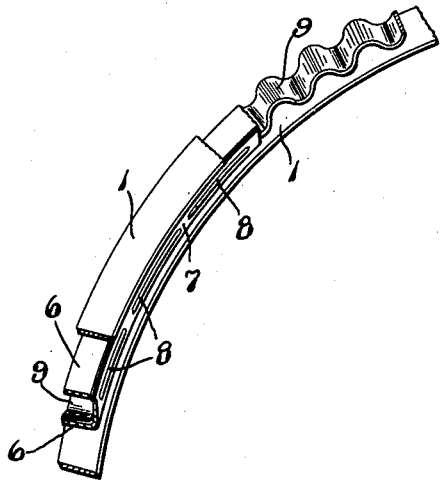
FIG. 3.
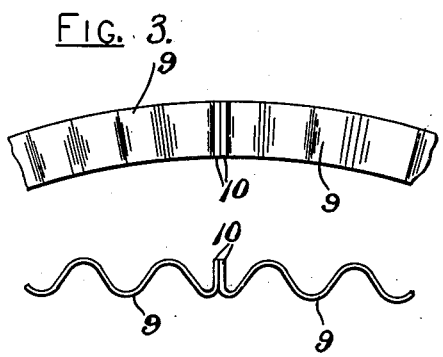
FIG. 4.
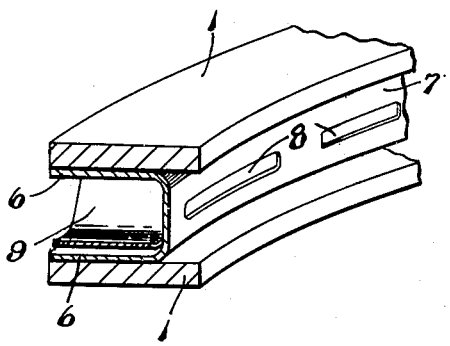
FIG. 5.
INVENTOR
ERNEST R. OLSEN
BY Frank E. Liverance, Jr.
ATTORNEY Patented Aug. 3, 1954

2,685,485

UNITED STATES PATENT OFFICE 2,685,485

PISTON RING SPACER

Ernest R. Olsen, Grand Haven, Mich.

Application October 22, 1953, Serial No. 387,560

3 Claims. (Cl. 309—43)

The present invention relates to a novel, simple and economically manufactured spacer for piston rings of the type in which the spacer is between upper and lower thin parted rails, one adapted to be located at the upper side of a piston ring groove, and the other at the lower side thereof, said rails being acted upon by a corrugated, thin metal ribbon expander having alternate humps of the corrugation bearing against the inner edges of the rails and the bottom of the piston ring groove.

Such type of piston ring, usually with a solid metal spacer between the rails, the spacer having vent passages through it for the return of oil scraped from cylinder walls and passing through the spacer to the bottom of the piston ring groove, thence drained to the interior of the piston, are known in the piston ring art. The expander, usually of cast iron, is narrow in thickness or axial dimension and with the vent passages therethrough is fragile, being relatively expensive to manufacture and subject to breakage in installation and many times in use after installation.

It is an object and purpose of the present invention to provide a spacer which is made very economically, wholly from sheet metal, is not subject to breakage in installation or afterward in service in an internal combustion engine, and which maintains the upper and lower rails in proper position supporting them against tilting or fluttering and giving them the necessary freedom of movement so that, at their outer edges, they will conform to the cylinder walls. Piston rings of the type noted are used largely in replacement, and after the cylinder walls have been worn after the engine has been extensively used, it is desirable that the rails shall follow the worn cylinder walls despite the variations which have taken place in the walls because of wear.

Additionally, in my invention it is an object and purpose to use the expander having a circumferentially compressible, thin metallic element of a corrugated character disposed with its outer edge against the cylinder wall and caused to follow the cylinder wall because of the tendency of such element to expand and attain the normal uncompressed condition which it had before installation. Such outer edges of the corrugated element thus used in connection with the spacer of my invention serves, in addition to its maintaining the rails properly spaced to act upon the cylinder wall, to scrape excess lubricating oil from the walls which, like in all rings of this type, moves inwardly through suitable vent and drainage passages to the interior of the piston.

The novel construction which preferably embodies my invention may be understood from the following description, taken in connection with the accompanying drawing, in which, Fig. 1 is a vertical section through a fragmentary portion of a piston and the adjacent cylinder wall, the section being at the lower or oil groove of the piston, the piston ring having the spacer of my invention being shown therein in vertical cross section.

Fig. 2 is a fragmentary perspective view of the spacer of my invention associated with the upper and lower rails with which it is used, parts being broken away from elements of the structure for better disclosure.

Fig. 3 is a plan view of the corrugated circumferentially compressible ribbon element of the spacer of my invention at the joint or parting therein.

Fig. 4 is an edge view of the fragmentary portion of such element shown in Fig. 3, and Fig. 5 is a fragmentary enlarged perspective and transverse cross section of the spacer used with the upper and lower rails in a piston ring, the expander to be used back of said piston ring being removed.

Like reference characters refer to like parts in the different figures of the drawing.

The spacer of my invention is adapted to be used between upper and lower thin steel rails 1 which are parted at one side in the usual manner and which, in the use of the assembled piston ring having my invention therein, are located at the upper and lower sides of a piston ring groove 2. A corrugated metal expander 3 also parted at one side for installation, is located in the bottom of the groove bearing at alternate humps of the expander against the bottom of the groove and inner edges of the rails 1. Piston 4, which has the ring groove therein in an internal combustion engine, reciprocates within the walls of a cylinder 5 in the usual manner.

The spacer forming the subject matter of my invention, used in the described environment, includes a channel of thin metal having upper and lower horizontal flanges 6 connected at their inner edges integrally by a web 7, in which a consecutive series of spaced slots 8 or other vent openings are made. The rails 1 are above and below the flanges 6 as shown in Fig. 1. The channel 6 is parted at one side and may be opened at such parting for installation and will be substantially closed at said parting when installed in the groove 2 of the piston 4 with the outer free edges of the flanges 6 closely adjacent to the inner walls of the cylinder 5.

Between the spaced flanges 6 of the channel member described a corrugated metal element 9 made from thin ribbon stock is located. The alternate humps of the corrugated element bear against the under side of the upper flange 6 while those at the lower side of the element bear against the lower flange 6. This corrugated element is parted at one side and the two ends of the metal are bent to lie radially and bear at adjacent sides against each other in abutting relation as shown in Fig. 4. Such element upon installation is circumferentially compressed, being of a dimension such that when free from such compression the outer edge portion of the element 9 would be located too far out to go within the cylinder 5 in which installed. Such circumferential compression causes the humps of the element 9 to move away from each other forming a firm support for the flanges 6 of the channel member in which installed, and also tends to move such element radially outward so that the outer edges thereof engaging the cylinder walls aid in scraping excess oil therefrom which will pass through the vent openings 8 in the web 7 and through suitable vent passages in the expander 3 to drainage openings leading from the ring groove 2 to the interior of the piston.

The spacer structure described, it is evident, is very readily and economically manufactured. The channel member having the flanges 6 and the web 7 may be expeditiously rolled and formed into its generally circular shape and parted at one side with the vent slots 8 cut during the operation. The element 9 likewise may be made in large quantity production. The labor cost is reduced to a minimum. The rails 1, which in general are of a thickness of approximately .025", are held and maintained in their proper relation to the piston, engine cylinder and groove in which they are located without tilting or fluttering and are pressed at their outer edges with the wall of the cylinder 5 by the expander 3, each having its desired independence of movement so as to follow the worn surfaces of the cylinder wall. Such spacers may be supplied for rings in ring grooves of varying widths and other dimensions, being capable of standard design for the standard ring groove dimensions which are used.

The structure described used as a novel spacer in association with a steel rail or rails, in itself is a complete piston ring and is usable as such, the overall axial distance between the outer sides of the sides of the flanges of the channel 6 conforming to and being but slightly less than the axial dimension of a piston ring groove in which installed. The novel structure of the spacer device, whether used as a spacer in conjunction with steel rails, or as a piston ring alone is defined in the appended claims which are to be considered comprehensive of all forms of structure coming within their scope.

I claim:

1. A spacer adapted to be assembled with a thin, parted, substantially flat metallic rail in a piston ring comprising, a parted, generally circular channel of thin metal having upper and lower spaced parallel flanges and an integral vented web between and connecting said flanges at their inner edges, and a thin metallic, generally circular, parted, corrugated member between said flanges, said member at the parting therein having abutting ends, and said member being circumferentially compressible on contracting pressure being applied thereto with said ends engaging against each other.

2. A spacer adapted to be assembled with a thin, parted, substantially flat metallic rail in a piston ring comprising, a parted, generally circular channel of thin metal having spaced horizontal, parallel flanges and a vertical, integral, web connecting the flanges at their inner edges, said web having vent openings therethrough, and a thin, metallic, generally circular, parted corrugated member between said flanges, having alternate upper and lower humps, and an outer edge adapted to bear against the inner side of an engine cylinder wall, said member at its parting having abutting ends, said member being circumferentially compressible upon installation in an engine cylinder.

3. A device of the class described comprising, a generally circular channel of thin metal having spaced, parallel upper and lower flanges and an integral, connecting web between the inner edges of said flanges, and a circumferentially compressible supporting member between said flanges comprising a length of thin metal of generally circular form having ends adapted to abut against each other, said member yieldingly resisting circumferential compression, and said member, between its ends, having alternate upper and lower humps disposed in two spaced, substantially horizontal planes.

References Cited in the file of this patent

UNITED STATES PATENTS

| Number | Name | Date |
|---|---|---|
| 2,229,578 | Malpas | Jan. 21, 1941 |
| 2,281,873 | Engelhardt | May 5, 1942 |
| 2,553,002 | Phillips | May 15, 1951 |